United States Patent [19]

von Haas

[11] Patent Number: 4,945,793
[45] Date of Patent: Aug. 7, 1990

[54] TOOL COUPLING

[75] Inventor: Rainer von Haas, Geesthacht, Fed. Rep. of Germany

[73] Assignee: Fried. Krupp Gesellschaft mit beschränkter Haftung, Essen, Fed. Rep. of Germany

[21] Appl. No.: 402,973

[22] Filed: Sep. 6, 1989

Related U.S. Application Data

[63] Continuation of Ser. No. 129,963, Dec. 4, 1987, abandoned, which is a continuation-in-part of Ser. No. 907,084, Sep. 12, 1986, Pat. No. 4,748,879.

[30] Foreign Application Priority Data

Sep. 14, 1985 [DE] Fed. Rep. of Germany ........ 3532891
Dec. 10, 1986 [DE] Fed. Rep. of Germany ........ 3642132

[51] Int. Cl.$^5$ .............................................. B23B 29/00
[52] U.S. Cl. ......................................... 82/161; 82/160; 82/157
[58] Field of Search ...................... 82/36 R, 36 B, 37; 407/102, 107, 117, 118, 77

[56] References Cited

U.S. PATENT DOCUMENTS

| 4,655,631 | 4/1987 | Mitchell | 82/36 B |
| 4,680,999 | 7/1987 | Kojima et al. | 82/36 B |

FOREIGN PATENT DOCUMENTS

| 0061075 | 9/1982 | European Pat. Off. . |
| 106087 | 4/1984 | European Pat. Off. . |
| 3314591 | 10/1984 | Fed. Rep. of Germany . |
| 3523891 | 7/1985 | Fed. Rep. of Germany . |
| 3541236 | 8/1987 | Fed. Rep. of Germany . |
| 2154479 | 9/1985 | United Kingdom . |
| 2163379 | 2/1986 | United Kingdom . |

OTHER PUBLICATIONS

Brochure of Komet Stahlhalter und Werkzeugfabrik Company, "Das Komet-ABS-System", (Jan. 1985) 4 pages.

Primary Examiner—Frederick R. Schmidt
Assistant Examiner—Lawrence Cruz
Attorney, Agent, or Firm—Spencer & Frank

[57] ABSTRACT

A tool coupling for connecting a tool head to a tool holder to secure the tool head against rotation and provide axial prestress. The tool head, which serves as a cutting tool, includes a shank having at least a portion which is conically configured, a threaded bore, and an annular contact collar. The tool holder includes a sleeve-shaped receiving bore corresponding to the shank, at least a portion of the receiving bore being conically configured, a tightening screw, and an annular contact face. An additional bore in the shank of the tool head ensures a prestress between the shank and the tool carrier including the receiving bore, and such prestress is not entirely relieved even if lateral forces act on the tool head. This keeps the tool head from vibrating in the receiving bore.

20 Claims, 6 Drawing Sheets

TOOL COUPLING

CROSS-REFERENCE TO RELATED APPLICATION

This application is a continuation of application Ser. No. 07/129,963, filed Dec. 4, 1987, now abandoned, is a continuation-in-part of Applicant's copending parent application Ser. No. 06/907,084, filed Sept. 12, 1986, now U.S. Pat. No. 4,748,879, issued Jun. 7, 1988.

BACKGROUND OF THE INVENTION

The present invention relates to a tool coupling for connecting a tool head to a tool holder so that the tool head is secure against rotation and axially tensioned, wherein the tool head serves as a tool and includes a shank having at least a portion that is conically configured, a threaded bore, and an annular contact collar, and wherein the tool holder has a sleeve-shaped receiving bore which corresponds to the shank and which includes at least a portion that is conically configured, a tightening screw, and an annular contact face. Such couplings are disclosed, for example, in Applicant's parent application (Ser. No. 06/907,084, filed Sept. 12, 1986) and are required, in particular, for metal cutting tools which are automatically inserted and handled.

In particular, the subject matter disclosed in the above-mentioned parent application includes a tool head having a bolt-like insertion section and a planar face adjacent the insertion section. The insertion section has a short conical portion adjacent the planar face, a cylindrical portion and, at the rear end, a supporting part which may be cylindrical or a short conical portion. This insertion section of the tool head, which is also called the shank, is inserted into a corresponding bore of a tool holder. The tool holder also has a planar face. The bore of the tool holder has a short conical portion adjacent the planar face of the tool holder, a cylindrical portion, and a guiding mating portion. When the insertion section of the tool head is introduced into the bore in the tool holder, any possible axial movement is limited by the fact that the short conical portions adjacent the planar faces of the tool head and the tool holder come in contact. Initially a gap exists between the planar faces. Only by the application of corresponding axial forces is an elastic deformation created in the region of the short conical portions until the planar faces of the tool holder and the tool head come in contact, and thus an axial fix is produced between the tool head and the tool holder.

The thus-produced prestress in the region of the short conical portions adjacent the planar faces has a magnitude such that, when transverse forces occur during cutting or milling, this prestress is not completely reduced down to zero, i.e. there is no complete stress relief.

If the supporting part at the rear end of the insertion section is cylindrical, the supporting part will, of course, have a slight play in its fit. If the supporting part is given a conical shape, a slight radial prestress may be selected so that the supporting part serves to support high transverse forces occurring at the cutting edges of the tool.

European Patent Application No. 0 106 087 B1 discloses a combination tool of the above-mentioned type which is distinguished by a continuous conical configuration of the clamping member. This construction, which is of advantage from a production point of view, results in significantly reduced prestress and thus reduced surface pressure, with the cone bearing the full load from front to back and with the same axial tensioning force. If there are high transverse forces at the cutting edges of the tool in the stress-relieved region of the cone, this has the effect that the prestress becomes zero and a hammering effect is produced since each metal cutting process has a dynamic or vibrating component of considerable magnitude.

SUMMARY OF THE INVENTION

It is therefore an object of the invention to provide a construction which permits prestress and large surface pressures between the shank and the tool holder under stress despite transverse forces, without there being too much of a reduction of the prestress.

This is accomplished, in accordance with the invention, by providing a tool head having a conical shank with a frontal blind bore which extends centrally along the longitudinal center axis of the tool head. The term "frontal" is intended to indicate that the blind bore has an opening at a surface. This bore permits the radial forces to easily deform the remaining cross section of the shank in the manner of a tube, since the diameter of the shank can be reduced. Nevertheless, the shank has a high bending strength. With a given axial force and a continuous, conical clamping member configuration, this results in the desired high surface pressure in the front section of the conical shank and naturally a lower surface pressure in the rear section of the conical shank. Here the term "rear section" of the shank refers to the portion directed toward the tool holder, that is, the portion adjacent the open end of the bore, and the term "front section" refers to the portion of the shank nearest the planar frontal face of the tool head.

According to another feature of the invention, the blind bore may either be cylindrical, stepped with a bore diameter which increases in the direction of the smallest diameter of the shank, or it may be frustoconical. Of course, mixed configurations between the stepped and frustoconical configuration are also possible.

In particular, it has been found that the object of the invention can be realized in an optimum manner if the depth of the blind bore is such that it is ½ to full length of the shank of the tool head. The bore cross section at the frontal face, or surface at which the bore opens, should be 70% to 97% of the smallest diameter of the shank. If the stated dimensions are adhered to, the bore, whether it is configured as a stepped bore or a conical bore, can be designed so that the surface pressure produced in the conical region by the prestress is predetermined and takes on such a value that, under the existing radial forces at the cutting edges of the tool, an unstressed conical region will not appear anywhere.

In the middle to rear region of the conical shank, which is less stressed by the radial prestressing, transverse bores to accommodate clamping members or longitudinal grooves for the transfer of torques can be inserted without any wear occuring at the transitions in the conical regions of the tool head and of the tool holder during the frequent tensioning and untensioning cycles.

DESCRIPTION OF THE PREFERRED EMBODIMENTS

Figure 1:
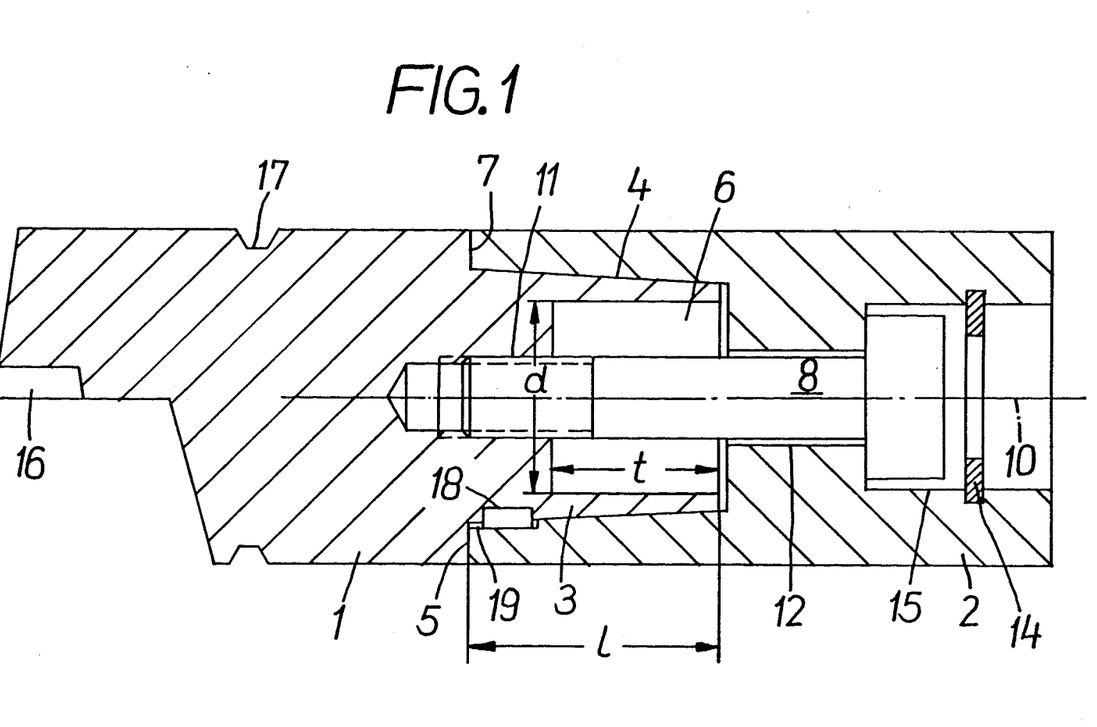
FIG. 1 is a cross-sectional view of a tool coupling in which the shank is provided with a central cylindrical bore.

The tool coupling shown in FIG. 1 is essentially composed of a tool head 1 having a conical shank 3 which has an annular contact collar 5 at its largest diameter. The end of tool head 1 that is opposite shank 3 has a cutting edge 16 which machines the workpiece (not illustrated) during machining. For automatic tool head exchange, a circumferential groove 17 is provided around tool head 1. An indexing means is employed to prevent tool head 1 from rotating during machining. In FIG. 1, the indexing means is provided by a key 18 which is affixed to tool head 1 and which engages a groove or keyway 19 in tool holder 2 (for the sake of clarity, means for indexing the tool head have been omitted from the remaining FIGS.).

To accommodate shank 3, a correspondingly shaped conical receiving bore 4 is provided in tool holder 2; or it may be provided in an exchangeable receiving sleeve (not illustrated) in tool holder 2.

Receiving bore 4 has an annular contact face 7 which, in the clamped state, comes in contact with annular contact collar 5. The elasticity of the shank 3 is ensured by a blind bore 6 provided in the shank 3 coaxially with the longitudinal center axis 10 of tool head 1. In the present case, blind bore 6 is cylindrical and has a depth t which is approximately ⅔ the total length 1 of shank 3. Furthermore, the diameter d of bore 6 is preferably 70% to 97% of the smallest outer diameter of shank 3.

Shank 3 is slightly over-dimensioned with respect to bore 4 so that, when it is inserted into bore 4, the outer periphery of shank 3 comes snugly into contact with the inner periphery of bore 4 before contact collar 5 reaches contact face 7. Tool head 1 must be clamped in to deform the wall of shank 3 slightly inward in the region of blind bore 6, and to deform the wall of tool holder 2 slightly outward essentially in the region past the bottom of blind bore 6, in order to bring contact collar 5 firmly into abutment against contact face 7. To clamp in the tool head 1, for example, a cylindrical screw 8 is provided which is guided and supported in a central threaded bore 11 provided in the tool head 1 and in a stepped bore 12, 15 in tool holder 2. If this cylindrical screw 8 is tightened, shank 3 is pulled into receiving bore 4 according to the pitch of the thread, with the elastic deformability of the front portion of the shank 3, in particular, permitting the annular contact face 5 to come in contact with contact face 7. The thus clamped-in tool head 1 with tightened cylindrical screw 8 is shown in FIG. 1. In the clamped-in state, tool head 1 is axially prestressed. The term "axially prestressed" means that the above-mentioned deformations produce a spring-like restoring force having a component along the longitudinal axis 10 of tool head 1.

Instead of the cylindrical screw 8, it is also possible to provide a differentially threaded screw (not illustrated), or sum screw, which engages both threaded bore 11 and threads (not illustrated) in bore 12 of tool holder 12.

Figure 2:
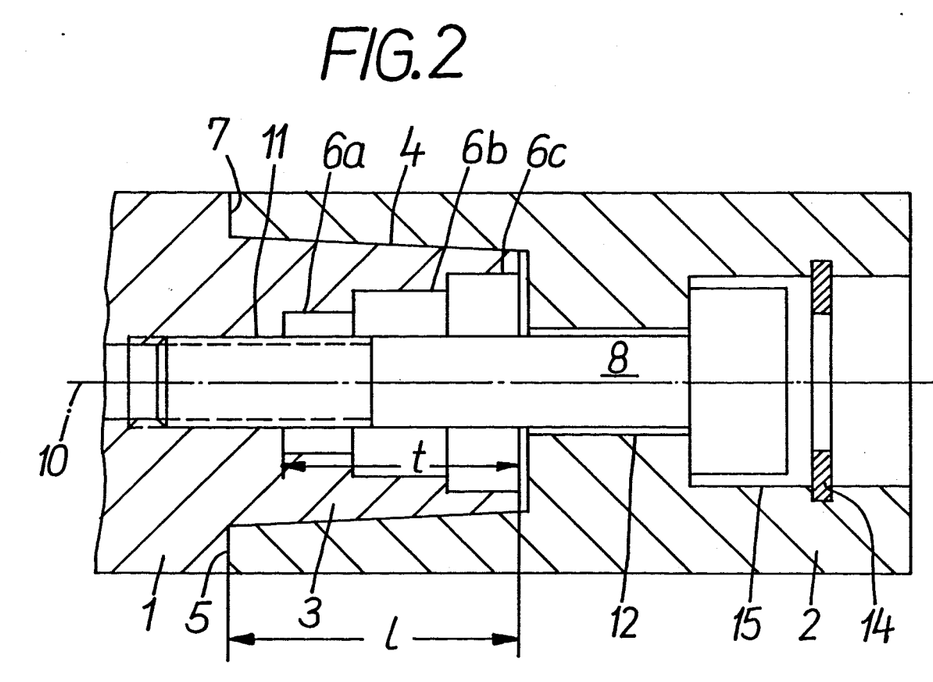
FIG. 2 is a corresponding cross-sectional view with a stepped blind bore.

In a corresponding coupling, FIG. 2 shows a further embodiment of the present invention which differs from the above-described embodiment only in that the central blind bore is composed of steps 6a, 6b and 6c.

Figure 3:
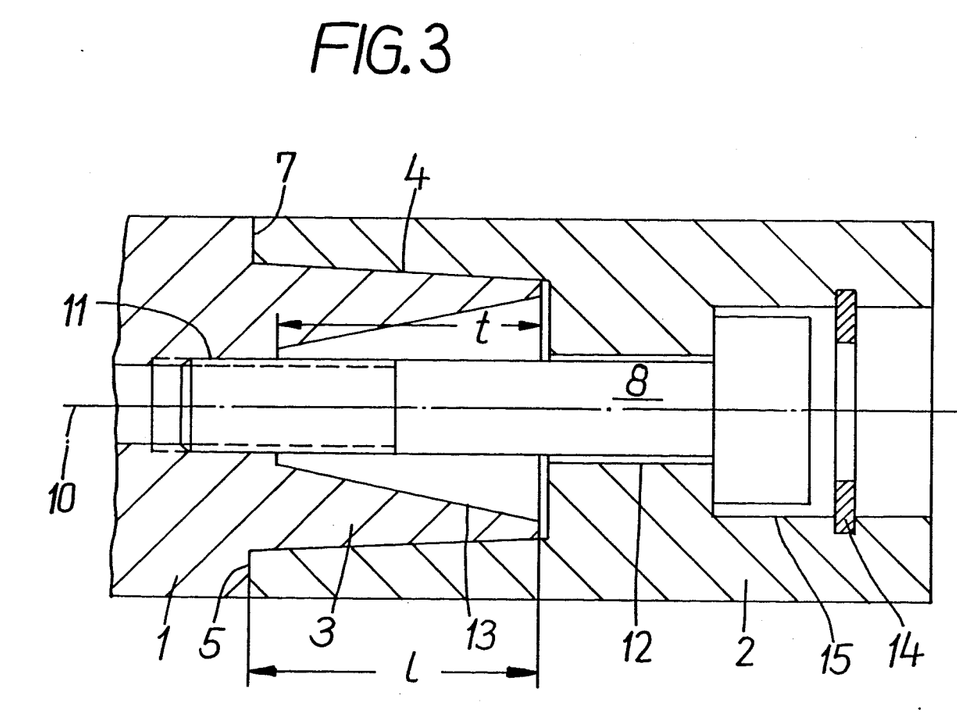
FIG. 3 is a corresponding cross-sectional view with a conical blind bore.

A further embodiment is shown in FIG. 3 which illustrates a conical blind bore 13.

Figure 4:
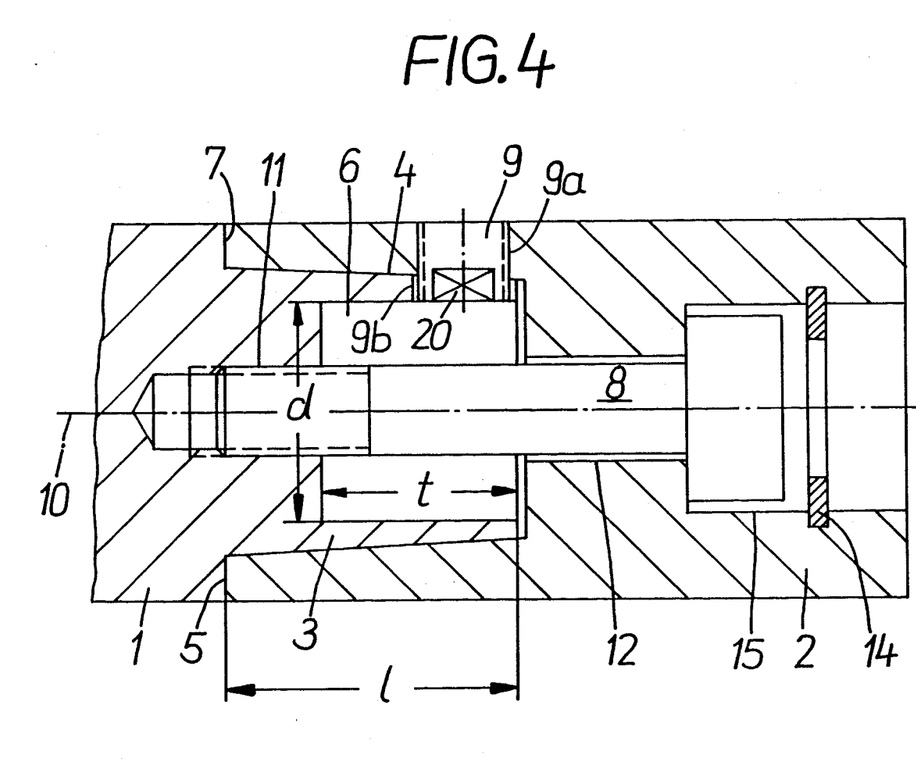
FIG. 4 is a corresponding cross-sectional view with a cylindrical blind bore and a radial transverse bore.

The embodiment according to FIG. 4 corresponds to that of FIG. 1 and includes a cylindrical blind bore 6 in which additionally there is provided a radial transverse threaded bore 9a in tool holder 2 to accommodate a screw 9 as a key with a flat part 20 which engages a key slot 9b that has a flat counterpart to part 20 in the shank 3. A plurality of radial transverse bores (not illustrated) may also be provided.

Figure 5:
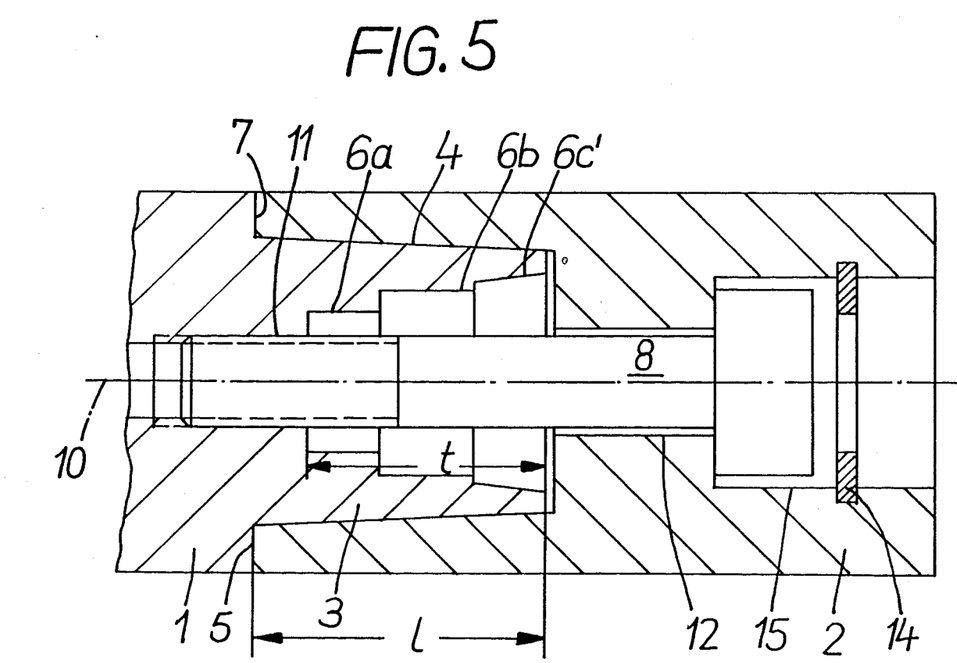
FIG. 5 is a corresponding cross-sectional view with a stepped blind bore with one frustoconical portion.

The embodiment according to FIG. 5 corresponds to that of FIG. 2 in that the central blind bore is composed of steps 6a, 6b and 6c'. Unlike step 6c in FIG. 2, however, step 6c' is frustoconical rather than cylindrical.

To release the coupling from the clamped position shown in FIGS. 1 to 5, the cylindrical screw 8 is screwed out of the threaded bore 11 until the head of the cylindrical screw 8 rests against a snap retaining ring 14 which is lodged in a groove in tool holder 2. If the screw is turned further, tool head 1 and shank 3 are moved out of receiving bore 4 of tool holder 2. Then tool head 1 is removed from the tool holder 2 by means of a gripping device (not illustrated).

The insertion of tool head 1 takes place in the reverse sequence, i. e. the shank 3 is introduced into receiving bore 4, then cylindrical screw 8 is tightened until annular collar 5 contacts face 7. Since in its frontal region, i. e. in the region of the open end of bore 6, shank 3 has slightly larger dimensions than the receiving bore 4 in the associated section, as was previously mentioned a certain prestress results during introduction of the shank 3 into receiving bore 4 up to the point where annular collar 5 and contact face 7 contact one another and this prestress is not noticeably reduced even if laterial forces act on the tool head 1, for example during milling or cutting. This prevents vibration of the tool head 1 in the receiving bore 4.

Figure 6:
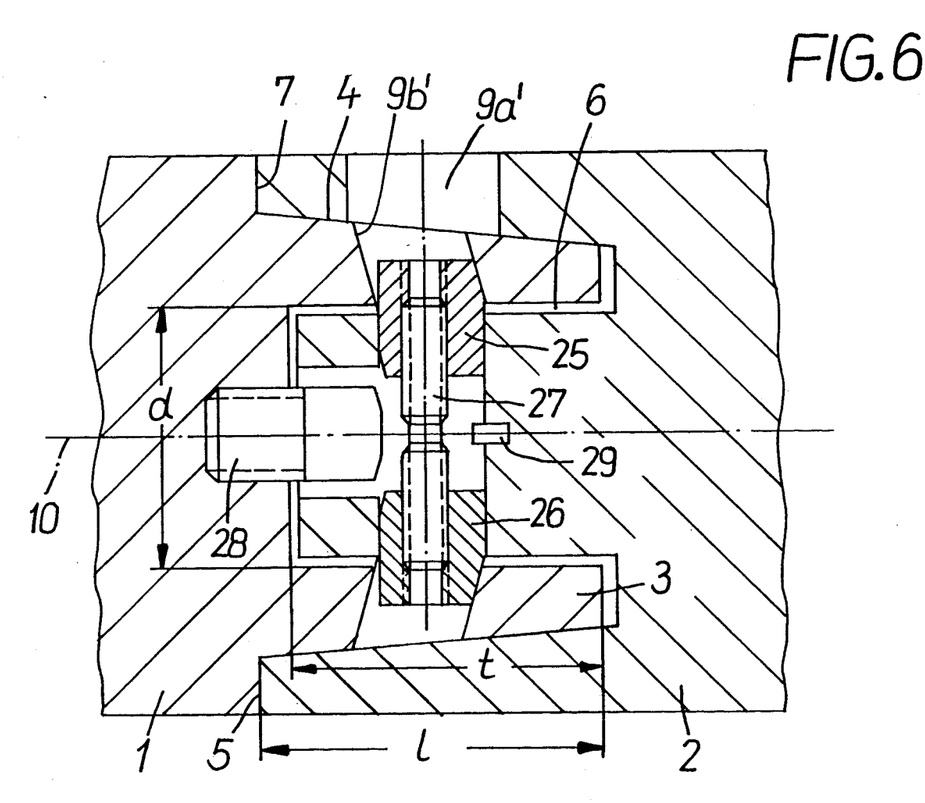
FIG. 6 is a corresponding cross-sectional view with a transverse clamping member.

FIG. 6 shows a further embodiment of the present invention, which differs from the above-described embodiments in that there is provided a radial transverse bore 9a' and 9b' which unlike the bore 9a and 9b in FIG. 4 is not used for a screw as a key but is open for access to a clamping member. This clamping member consists of a screw 27 and two clamping elements 25 and 26. In clamping element 25 the screw 27 has a left hand thread and in 26 it has a right hand thread. By fastening the screw the clamping elements 25 and 26 move towards the shank 3 and force the shank 3 to move further into the bore 4. This clamped position is shown in FIG. 6.

To release the coupling from the clamped position the screw 27 is screwed out of the clamping element 26. The clamping elements 25 and 26 move towards the bolt 28 which is screwed into the tool head 1 at the bottom of the blind bore 6, touch the bolt 28 and finally move the tool holder 2 out of the blind bore 6 by pressing against the bolt 28. In the released position the clamping device is smaller than the diameter and the tool head can be removed. Pin 29 prevents the clamping member from falling off through the bore 9a'.

The present disclosure relates to the subject matter disclosed in Federal Republic of Germany Application P 36 42 132.4, filed Dec. 10, 1986, the entire disclosure of which is incorporated herein by reference.

It will be understood that the above description of the present invention is susceptible to various modifications, changes and adaptations, and the same are intended to be comprehended within the meaning and range of equivalents of the appended claims.

What I claim is:

1. A tool coupling arrangement, comprising:
   a tool head which serves as a cutting tool and which has a longitudinal center axis, the tool head additionally having a threaded bore and an annular contact collar;
   a tool holder having a sleeve-shaped receiving bore, with at least a portion of the receiving bore being conically configured and having a predetermined cone angle, the tool holder additionally having an annular contact face; and
   tool coupling means for connecting the tool head and the tool holder so that the tool head is secured against rotation and is axially prestressed, the tool coupling means including a shank attached to the tool head for insertion into the receiving bore, at least a portion of the shank being conically configured and having a cone angle that is equal to the cone angle of the receiving bore, the shank having a frontal blind bore which extends centrally along the longitudinal axis of the tool head, and a tightening screw mounted on the tool holder at a position to engage the threaded bore of the tool head,
   wherein the blind bore has a frontal face and a bore diameter at the frontal face, wherein the shank has a region of smallest diameter, and wherein the bore diameter at the frontal face ranges from about 70% to about 97% of the smallest diameter of the shank, and
   wherein the blind bore has a depth and the shank has a length, the depth of the blind bore being greater than ½ the length of the shank.

2. The tool coupling arrangement of claim 1, wherein the blind bore in the shank is cylindrical.

3. The tool coupling arrangement of claim 1, wherein the blind bore in the shank is a stepped bore having bore portions with different diameters, the diameters of the bore portions increasing toward the region of smallest diameter of the shank.

4. The tool coupling arrangement of claim 3, wherein the bore portions are cylindrical.

5. The tool coupling arrangement of claim 3, wherein the bore portions are frustoconical.

6. The tool coupling arrangement of claim 3, wherein at least one of the bore portions is cylindrical and at least one of the bore portions is frustoconical.

7. The tool coupling arrangement of claim 1, wherein the blind bore in the shank has a conical shape.

8. The tool coupling arrangement of claim 1, wherein the tool holder and the shank have at least one radial transverse bore to accommodate a clamping member.

9. The tool coupling arrangement of claim 1, wherein the shank has longitudinal grooves for the transfer of torque.

10. A tool coupling arrangement, comprising:
    a tool head which serves as a cutting tool and which has a longitudinal center axis, the tool head additionally having an annular contact collar;
    a tool holder having a sleeve-shaped receiving bore, with at least a portion of the receiving bore being conically configured and having a predetermined cone angle, the tool holder additionally having an annular contact face; and
    tool coupling means for connecting the tool head and the tool holder so that the tool head is secured against rotation and is axially prestressed, the tool coupling means including a shank attached to the tool head for insertion into the receiving bore, at least a portion of the shank being conically configured and having a cone angle that is equal to the cone angle of the receiving bore, the shank having a frontal blind bore which extends centrally along the longitudinal axis of the tool head,
    wherein the blind bore has a frontal face and a bore diameter at the frontal face, wherein the shank has a region of smallest diameter, and wherein the bore diameter at the frontal face ranges from about 70% to about 97% of the smallest diameter of the shank, and
    wherein the blind bore has a depth and the shank has a length, the depth of the blind bore being greater than ½ the length of the shank.

11. The tool coupling arrangement of claim 10, wherein the tool holder and the shank have at least one radial transverse bore to accommodate a clamping member.

12. The tool clamping arrangement of claim 10, wherein the tool holder and the shank have a radial transverse bore, and wherein the tool coupling means comprises a radially movable clamping element, and screw means for selectively moving the clamping element into the transverse bore of the shank.

13. The tool clamping arrangement of claim 12, wherein the clamping element and the radial transverse bore in the shank have sloping surfaces which are configured to urge the shank into the tool holder as the clamping element is selectively moved into the transverse bore of the shank.

14. The tool clamping arrangement of claim 13, further comprising a bolt affixed to the tool head, inside the blind bore in the shank, at a position to engage the clamping element and urge the tool head out of the tool holder when the clamping element is selectively moved out of the transverse bore in the shank.

15. The tool clamping arrangement of claim 10, wherein the shank has an outer end at which the blind bore opens; wherein the shank is inwardly deformed, adjacent the outer end thereof, by engagement with the receiving bore when the tool head is axially prestressed; and wherein the tool holder is outwardly deformed, adjacent the annular contact face thereof, by engagement with the shank when the tool head is axially prestressed.

16. The tool clamping arrangement of claim 10, wherein the at least a portion of the receiving bore that is conically configured extends for greater than the depth of the blind bore; and wherein the at least a portion of the shank that is conically configured extends, for greater than the depth of the blind bore.

17. The tool clamping arrangement of claim 1, wherein the shank has an outer end at which the blind bore opens; wherein the shank is inwardly deformed, adjacent the outer end thereof, by engagement with the receiving bore when the tool head is axially prestressed; and wherein the tool holder is outwardly deformed, adjacent the annular contact face thereof, by engagement with the shank when the tool head is axially prestressed.

18. The tool clamping arrangement of claim 1, wherein the at least a portion of the receiving bore that is conically configured extends for greater than the depth of the blind bore; and wherein the at least a portion of the shank that is conically configured extends for greater than the length of the blind bore.

19. The tool clamping arrangement of claim 1, wherein the bore diameter at the frontal face is substantially greater than 70% of the smallest diameter of the shank.

20. The tool clamping arrangement of claim 10, wherein the bore diameter at the frontal face is substantially greater than 70% of the smallest diameter of the shank.

* * * * *